United States Patent
Creaby et al.

(10) Patent No.: US 11,568,563 B2
(45) Date of Patent: Jan. 31, 2023

(54) POSE ESTIMATION AND APPLICATIONS USING COMPUTER IMAGING

(71) Applicant: Trimble Inc., Sunnyvale, CA (US)

(72) Inventors: Justin Creaby, Westminster, CO (US); Brandon Sights, San Marcos, CA (US)

(73) Assignee: Trimble Inc., Sunnyvale, CA (US)

( * ) Notice: Subject to any disclaimer, the term of this patent is extended or adjusted under 35 U.S.C. 154(b) by 184 days.

(21) Appl. No.: 16/731,856

(22) Filed: Dec. 31, 2019

(65) Prior Publication Data
US 2021/0201531 A1 Jul. 1, 2021

(51) Int. Cl.
*G06T 7/80* (2017.01)
*G06T 7/73* (2017.01)
*B60R 1/00* (2022.01)

(52) U.S. Cl.
CPC .......... *G06T 7/74* (2017.01); *B60R 1/00* (2013.01); *G06T 7/80* (2017.01); *B60R 2300/402* (2013.01); *B60R 2300/808* (2013.01)

(58) Field of Classification Search
CPC .... G06T 7/74; G06T 7/80; B60R 1/00; B60R 2300/808; B60R 2300/402
See application file for complete search history.

(56) References Cited

U.S. PATENT DOCUMENTS

| | | | | |
|---|---|---|---|---|
| 10,144,417 | B1* | 12/2018 | Zhang | B60W 10/18 |
| 2017/0123431 | A1* | 5/2017 | Ghneim | G06V 20/56 |
| 2017/0174023 | A1* | 6/2017 | Hu | B60K 35/00 |
| 2017/0174130 | A1* | 6/2017 | Hu | B60C 5/00 |
| 2017/0177973 | A1* | 6/2017 | Hu | G06V 20/56 |
| 2017/0178328 | A1* | 6/2017 | Hu | H04N 7/183 |
| 2017/0297619 | A1 | 10/2017 | Lavoie et al. | |
| 2019/0297233 | A1* | 9/2019 | Gali | G06T 7/60 |
| 2019/0391260 | A1* | 12/2019 | Schmidt | B60T 7/12 |
| 2020/0148256 | A1* | 5/2020 | Brimmer | B62D 15/025 |
| 2020/0334475 | A1* | 10/2020 | Joseph | B62D 13/06 |
| 2020/0346581 | A1* | 11/2020 | Lawson | G06T 7/73 |
| 2020/0346690 | A1* | 11/2020 | Maruoka | B62D 13/06 |
| 2020/0353969 | A1* | 11/2020 | Sypitkowski | B62D 13/06 |

FOREIGN PATENT DOCUMENTS

WO 2016/205559 A1 12/2016

OTHER PUBLICATIONS

International Search Report and Written Opinion for Application No. PCT/US2020/065732, dated Mar. 23, 2021, 12 pages.

* cited by examiner

*Primary Examiner* — Zaihan Jiang
(74) *Attorney, Agent, or Firm* — Kilpatrick Townsend & Stockton LLP

(57) ABSTRACT

Embodiments describe a method for positioning a hinged vehicle including a primary part and a secondary part coupled to the primary part at a project site. The method includes receiving, from an image capturing device, digital image data representing one or more features of the secondary part; performing image analysis on the digital image data to identify positions of the one or more features of the secondary part; identifying an angle of at least a portion of the secondary part; calculating a current position of the secondary part based on the angle; calculating a positional difference between a correct position at the project site for the secondary part and a current position of the secondary part at the project site; and initiating a change in a position of the primary part to compensate for the positional difference and to position the secondary part on the correct position.

20 Claims, 7 Drawing Sheets

POSE ESTIMATION AND APPLICATIONS USING COMPUTER IMAGING

BACKGROUND

Large hinged vehicles like tractor trailers, articulated machines, and implements, e.g., construction tools, farming tools, and the like, that are coupled to a vehicle, are used for various purposes at project sites and farming plantations. Such vehicles often include two parts: a primary part (e.g., vehicle) and a secondary part (e.g., a trailer or implement) that are coupled together by a hinge. The primary part can be an active component that can move on its own, and the secondary part can be either a passive component that cannot move on its own (e.g., a plow implement), or an active component (e.g., a drum of a compactor that is hydraulically driven by its own steering system). As an example, a tractor coupled to a plow implement can push or pull the implement across a farm to plow the land, deposit seeds, water the seeds, and the like. Because the vehicle is coupled to the implement by a hinge, the position of the implement has a degree of positional independence with respect to the vehicle. Accordingly, it may be difficult to position the implement with high accuracy during operation, especially when the underlying surface on which the implement and vehicle are positioned is uneven and/or sloped. Thus, improvements to positional accuracy with such hinged vehicles are desired.

SUMMARY

Embodiments provide pose estimating systems and methods for highly accurate positioning of an implement using computer imaging. The pose estimating system can be an electronic system installed on a hinged vehicle, e.g., on a vehicle that is pulling or pushing an implement. The pose estimating system can capture images of at least a part of the implement and calculate an orientation, e.g., an angle, and a position of the implement based on the captured images of the implement. With the angle and position information known, the pose estimating system can then cause the vehicle to change its location to compensate for any shifts in the position of the implement caused by ground slope/undulations, thereby enabling the vehicle to accurately position the implement on a desired path within a project site. The pose estimating system also eliminates the need to implement an expensive positioning device, such as a global navigation satellite system (GNSS) and/or an inertial measurement unit (IMU), on the implement.

In some embodiments, a method for positioning a hinged vehicle including a primary part and a secondary part coupled to the primary part at a project site includes: receiving, by a pose estimation control system from an image capturing device, digital image data representing one or more features of the secondary part; performing, by the pose estimation control system, image analysis on the digital image data to identify positions of the one or more features of the secondary part; identifying, by the pose estimation control system, an angle of at least a portion of the secondary part based on the positions of the one or more features of the secondary part from the analysis of the digital image data; calculating, by the pose estimation control system, a current position of the secondary part based on the angle of the at least a portion of the secondary part; calculating, by the pose estimation control system, a positional difference between a correct position at the project site for the secondary part and a current position of the secondary part at the project site; and initiating, by the pose estimation control system, a change in a position of the primary part to compensate for the positional difference and to position the secondary part on the correct position.

The image capturing device can be implemented on the primary part and captures images within a field of view that includes at least a portion of the secondary part. The primary part can move the secondary part by pushing or pulling the secondary part across the project site. The method can further include capturing a calibration image of the at least a portion of the secondary part when the secondary part is positioned in-line with the primary part; storing the image in memory; and linking the calibration image to a reference position for the secondary part so that the pose estimation control system can use the reference position of the secondary part to calculate the angle. The image analysis includes analyzing contrasting pixels to identify positions of features of the secondary part, and using the positions of the features to identify the angle of the secondary part. The image analysis can include analyzing distance measurements of points of the secondary parts to identify features of the secondary part, and using the positions of the features to identify the angle of the secondary part. The primary part can be a vehicle and the secondary part can be an implement. Changing the position of the primary part can include outputting an instruction to a user interface that causes a driver of the hinged vehicle to steer the primary part. Changing the position of the primary part can include instructing a vehicle control system to move and steer the hinged vehicle along a corrected primary part position so that the secondary part is positioned on the correct position without user involvement.

In certain embodiments, a computer product can include a non-transitory computer readable medium storing a plurality of instructions that when executed control an electronic device including one or more processors. The electronic device is configured to position a hinged vehicle including a primary part and a secondary part coupled to the primary part at a project site. The instructions include: receiving, by a pose estimation control system from an image capturing device, digital image data representing one or more features of the secondary part; performing, by the pose estimation control system, image analysis on the digital image data to identify positions of the one or more features of the secondary part; identifying, by the pose estimation control system, an angle of at least a portion of the secondary part based on the positions of the one or more features of the secondary part from the analysis of the digital image data; calculating, by the pose estimation control system, a current position of the secondary part based on the angle of the at least a portion of the secondary part; calculating, by the pose estimation control system, a positional difference between a correct position at the project site for the secondary part and a current position of the secondary part at the project site; and initiating, by the pose estimation control system, a change in a position of the primary part to compensate for the positional difference and to position the secondary part on the correct position.

Wherein the image capturing device can be implemented on the primary part and capture images within a field of view that includes at least a portion of the secondary part. The primary part can move the secondary part by pushing or pulling the secondary part across the project site. The computer product can further include capturing a calibration image of the at least a portion of the secondary part when the secondary part is positioned in-line with the primary part; storing the image in memory; and linking the calibration image to a reference position for the secondary part so that the pose estimation control system can use the reference position of the secondary part to calculate the angle. The image analysis can include analyzing contrasting pixels to identify positions of features of the secondary part; and using the positions of the features to identify the angle of the secondary part.

In some further embodiments, a system for positioning a hinged vehicle can include a primary part and a secondary part coupled to the primary part at a project site, the system includes: an image capturing device mounted on the primary component; memory configured to store data; a control interface for displaying information to a user; and a pose estimation control module formed of one or more processors coupled to the image capturing device, the memory, and the control interface. The pose estimation control module is configured to: receive, by the pose estimation control module from an image capturing device, digital image data representing one or more features of the secondary part; perform, by the pose estimation control module, image analysis on the digital image data to identify positions of the one or more features of the secondary part; identify, by the pose estimation control module, an angle of at least a portion of the secondary part based on the positions of the one or more features of the secondary part from the analysis of the digital image data; calculate, by the pose estimation control module, a current position of the secondary part based on the angle of the at least a portion of the secondary part; calculate, by the pose estimation control module, a positional difference between a correct position at the project site for the secondary part and a current position of the secondary part at the project site; and initiate, by the pose estimation control module, a change in a position of the primary part to compensate for the positional difference and to position the secondary part on the correct position.

The image capturing device can be implemented on the primary part and capture images within a field of view that includes at least a portion of the secondary part. The pose estimation control module can be coupled to a vehicle control system that includes a vehicle control module for controlling the operation of the hinged vehicle without user involvement. The vehicle control system further can include a camera, a sensor, and a motor with steering to control the operation of the hinged vehicle. The primary part can move the secondary part by pushing or pulling the secondary part across the project site. The pose estimation control module can be further configured to: capture a calibration image of the at least a portion of the secondary part when the secondary part is positioned in-line with the primary part; store the image in memory; and link the calibration image to a reference position for the secondary part so that the pose estimation control system can use the reference position of the secondary part to calculate the angle.

A better understanding of the nature and advantages of embodiments of the present invention may be gained with reference to the following detailed description and the accompanying drawings.

DETAILED DESCRIPTION

Embodiments describe a pose estimation control system for accurately positioning an implement during operation. The pose estimation control system can include a control module that receives digital image data from one or more image capturing devices positioned on the vehicle. The image capturing devices can capture images of at least a portion of the implement, and then send the captured images to the control module in digital format. The control module can then perform image analysis on the digital image data to calculate an orientation of the implement in three-dimensional (3D) space. The calculated orientation of the implement can then be used to calculate a current position of the implement and then compare the current position of the implement with a correct, intended position of the implement. The control module can then initiate a change in vehicle position to compensate for any positional difference between the current position of the implement and the correct position of the implement, thereby accurately positioning the implement on the correct position.

In some instances, the pose estimation control system can be autonomous so that the movement of the vehicle and implement is solely controlled by the pose estimation control system with little to no user involvement. Accordingly, the pose estimation control module can be configured to send controls to a vehicle control module to directly control the movement of the vehicle. In such instances, the image capturing devices used for posed estimation purposes can be the same image capturing devices implemented on the vehicle used for object avoidance and autonomous driving. Accordingly, additional image capturing devices are not needed to provide this advanced functionality, thereby saving cost while improving vehicle operation.

As will be discussed further herein, the pose estimation control system is an improvement upon many conventional hinged vehicles, which are basic vehicles that cannot determine where the vehicle should be positioned to accurately position the implement on a correct path. Without the ability to determine its own positon, the hinged vehicle cannot accurately position the implement, and the position of the implement is solely dependent on the user's skills and awareness of his or her surroundings, which can lead to inaccurate positioning of the implement. Some conventional hinged vehicles use positioning-specific sensors, such as IMUs, on the implement to determine the position of the implement, which can increase cost and complexity in design and use.

I. Implement Positioning by a Hinged Vehicle at a Project Site

Figure 1:
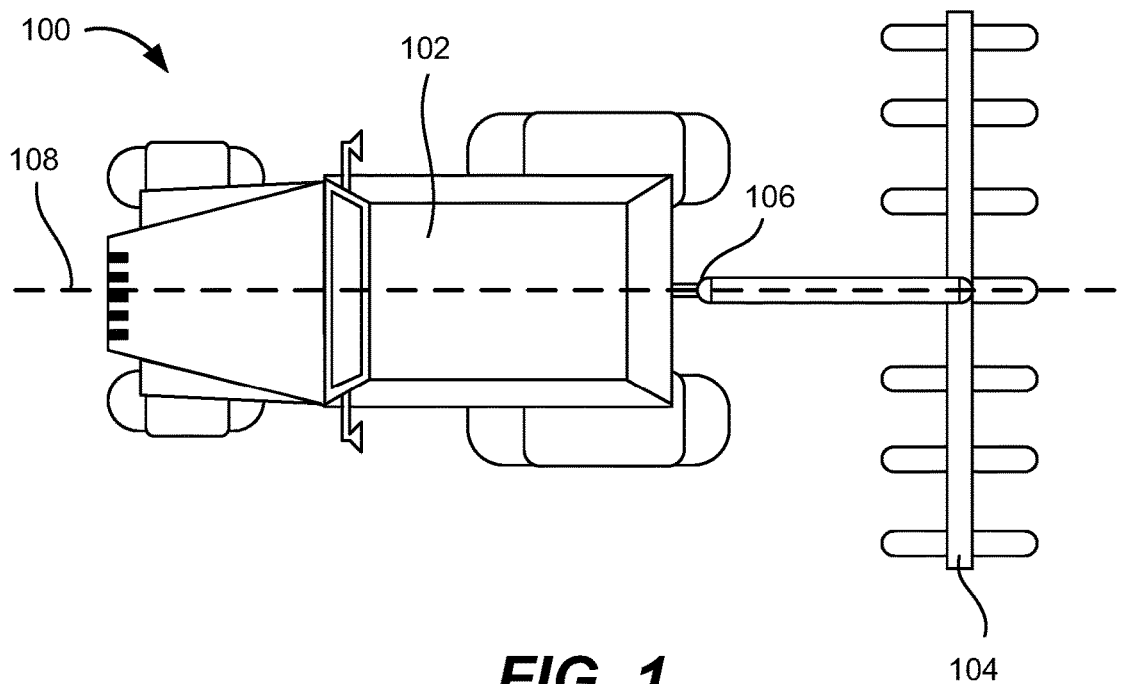
FIG. 1 is a simplified top-down illustration of an example hinged vehicle including a vehicle coupled to an implement by way of a hinge.

FIG. 1 is a simplified top-down illustration of an example hinged vehicle 100 including a vehicle 102 coupled to an implement 104 by way of a hinge 106 on flat ground. In this non-limiting example, vehicle 100 is a farm tractor that is pulling implement 104, which is a farm plow on flat ground. Implement 104 may be pulled by vehicle 100 across farmland to form furrows and for sowing seed or planting within those furrows or other narrowly-defined regions. To sow seed or plant within the furrows, the position of the implement may need to be accurately placed over the furrows. Thus, it may be important for implement 104 to be accurately positioned on the farmland as it is pulled by vehicle 100.

For instance, as shown in FIG. 1, a correct path for implement 104 to plant seeds in narrow furrows may be designated by a correct position 108 shown as a dashed line. To place the center of implement 104 on correct position 108, vehicle 102 can drive along a path defined by correct position 108. When the ground is flat and there are little to no undulations in the ground, the position of the center of implement 104 may be in-line with the center of vehicle 102. Accordingly, the driver of vehicle 102 can reasonably expect the position of implement 104 to be in-line with the position of vehicle 102. Thus, the driver can just drive along correct position 108 to correctly position implement 104 on the farmland.

However, in real-case scenarios, the land may not be flat but sloped with some undulations. In such cases, the position of an implement may not be in-line with the center of a vehicle pulling the implement, as shown in FIG. 2.

Figure 2:
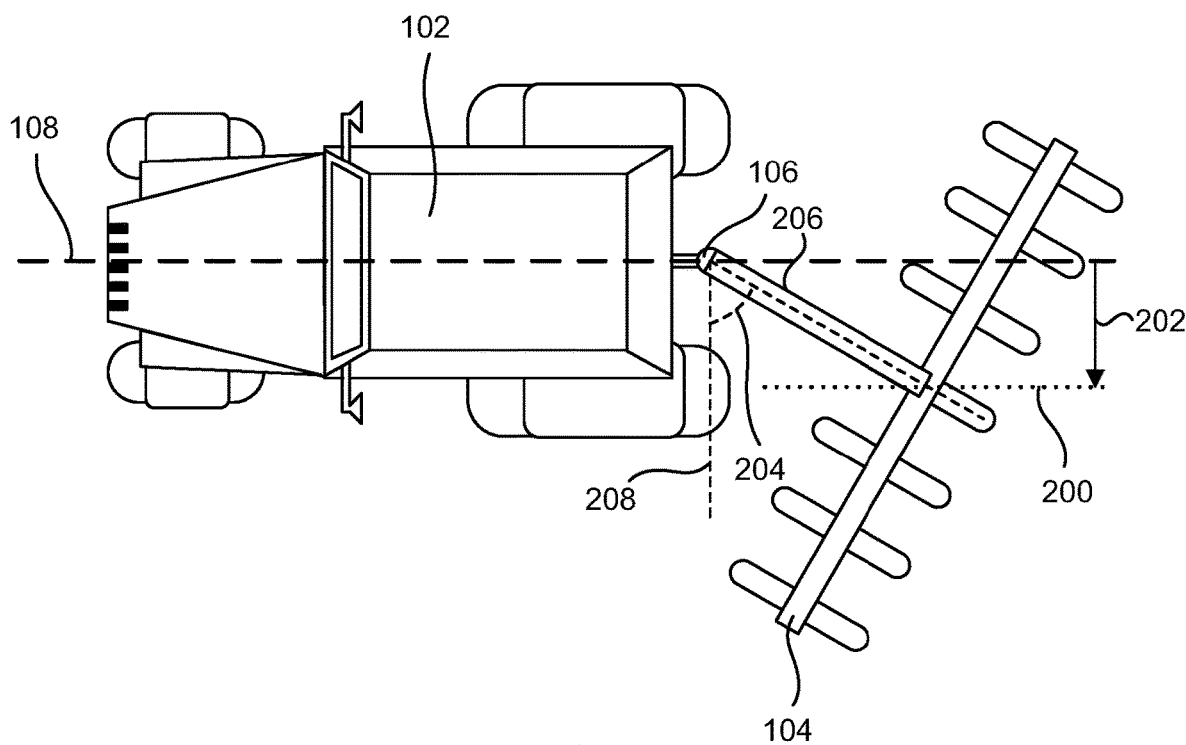
FIG. 2 is a simplified top-down illustration of the hinged vehicle in FIG. 1 on a sloped surface that is sloping down to the left such that the right wheels of the vehicle are at a higher elevation than its left wheels.

FIG. 2 is a simplified top-down illustration of hinged vehicle 100 on a sloped surface that is sloping down to the left such that the right wheels of vehicle 102 are at a higher elevation than its left wheels. Because of the hinged connection between vehicle 102 and implement 104, the position of implement 104 may not be in-line with the center of vehicle 102. Rather, implement 104 may shift to a current position 200 spaced an offset distance 202 away from correct position 108. At current position 200, implement 104 may be positioned at an angle 204 defined by the center of implement connecting rod 206 and a backplane 208 of vehicle 102 intersecting hinge 106. The shifting of implement 104 may be caused by gravity from the slope of, and/or any undulations in, the ground. In such instances, even though vehicle 102 is driving along correct position 108, implement 104 may not be positioned along correct position 108, and thus may not be planting seeds within furrows. Accordingly, the farmland may not be properly planted with seeds.

II. Positioning by a Hinged Vehicle Implemented with a Pose Estimation Control System at a Project Site According to some embodiments of the present disclosure, a pose estimation control system can be implemented in a hinged vehicle to accurately position an implement in a correct position. The pose estimation control system can estimate a position of an implement and cause the vehicle to change its position to offset the shift in position of the implement caused by sloped and/or undulated ground. By offsetting this shift, the pose estimation control system can enable the vehicle to accurately place the implement in the correct position. An example hinged vehicle implemented with such a pose estimation control system is discussed herein with respect to FIG. 3.

Figure 3:
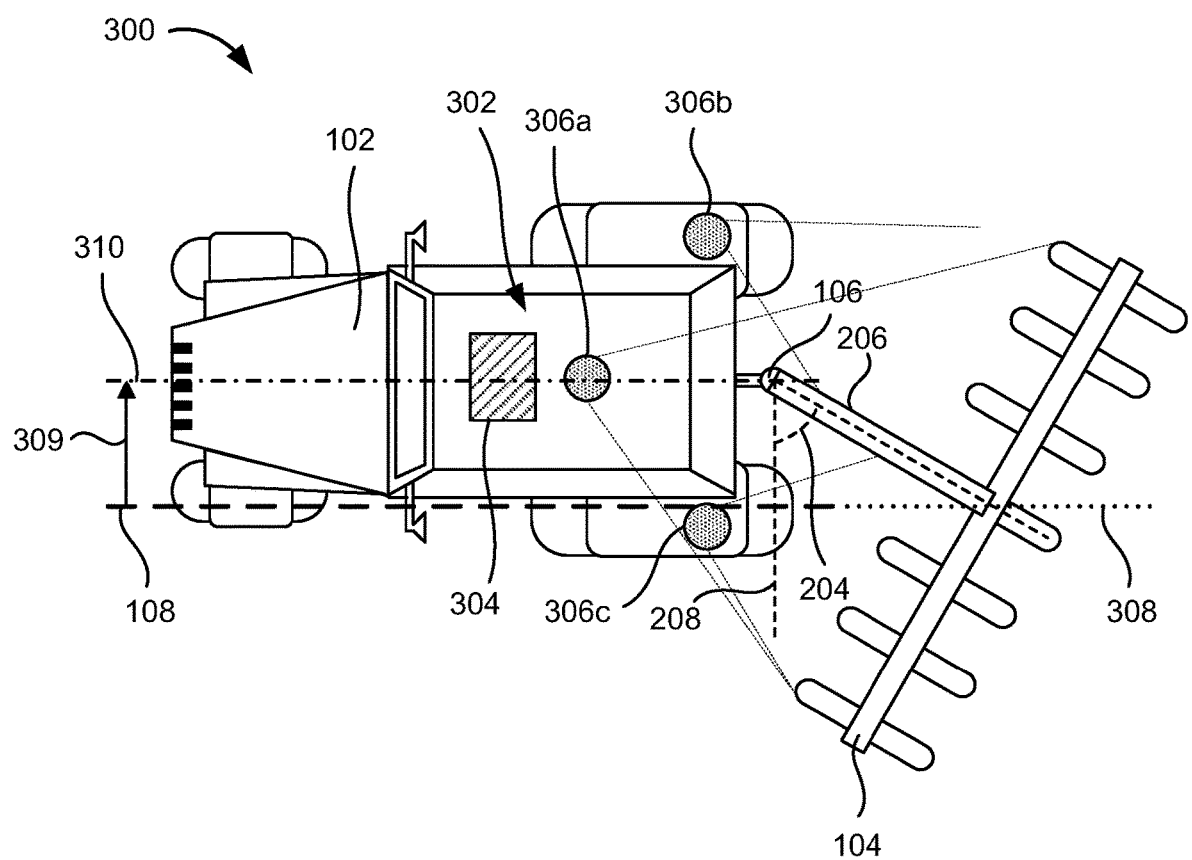
FIG. 3 is a simplified top-down illustration of a hinged vehicle implemented with a pose estimation control system, according to some embodiments of the present disclosure.

FIG. 3 is a simplified top-down illustration of a hinged vehicle 300 implemented with a pose estimation control system 302, according to some embodiments of the present disclosure. Pose estimation control system 302 can include a pose estimation control module 304 electrically coupled to one or more image capturing devices 306a-c. Pose estimation control module 304 can be a processor, central processing unit (CPU), application-specific integrated circuit (ASIC), field-programmable gate array (FPGA), and the like or a combination thereof. Image capturing devices 306a-c can each be any suitable electronic device that can perform computer imaging by capturing images of its surrounding environment, such as, but not limited to, a two-dimensional (2D) red-green-blue (RGB) camera and a light detection and ranging (LIDAR) device. It is to be appreciated that image capturing devices 306a-c can be any suitable image capturing device or advanced perception system implemented by an autonomous vehicle for observing its surrounding environment to prevent collision and/or perform object avoidance. Pose estimation control system 302 can leverage any of such image capturing systems and/or advanced perception systems to minimize cost while providing advanced functionality.

In some instances, image capturing devices 306a-c can be configured to capture images of at least a portion of implement 104. As an example, image capturing devices 306a-c can each be a spinning image capturing device that captures images of its surrounding environment across a 360° viewing angle. Thus, at least a portion of the viewing angle can capture images of implement 104 each time the camera makes a full 360° rotation, as represented by the thin dashed lines shown in FIG. 3. Alternatively, image capturing devices 306a-c can each be a stationary image capturing device whose viewing angle captures at least a portion of implement 104. In some embodiments, image capturing devices 306a-c can be any combination of spinning and stationary image capturing devices without departing from the spirit and scope of the present disclosure. In instances where vehicle 102 is an autonomous vehicle that is driven by a computer, image capturing devices 306a-c can be cameras/sensors that are used for autonomous driving, whose captured images are given additional functionality to provide images of implement 104 for positioning purposes discussed herein.

That is, according to some embodiments of the present disclosure, captured images of implement 104 as hinged vehicle 300 moves across the farmland can be sent to pose estimation control module 304, which can then analyze the captured images of implement 104 to identify a current position of implement 104 and cause a change in the position of vehicle 102 to position implement 104 on correct position 108 in instances where the current position of implement 104 is not on correct position 108 (see FIG. 2 and discussion thereof).

In instances where image capturing device is a 2D RGB camera, pose estimation control module 304 can receive digital image data of implement 104 in 2D and then analyze pixel data of the digital image data to identify angle 204 of implement 104 in 3D. Analysis of the pixel data includes identifying contrasts between pixels to determine feature locations for tracking. Thus, when the pixel data represents movements of those features, pose estimation control module 304 can track those movements to identify angle 204 of implement 104.

In instances where the image capturing device is a LIDAR device, pose estimation control module 304 can receive 3D digital image data of implement 104 represented by distance measurements to various points on implement 104 and then analyze the distances to the points to identify angle 204 of implement 104 in 3D. The distance measurements can be calculated by time-of-flight measurements from emitted light once it has reflected off of surfaces of implement 104. The distances to various points on implement 104 can be collected and analyzed to determine feature locations for tracking. Thus, when the distance measurements of points at those features move, pose estimation control module 304 can track those movements to identify angle 204 of implement 104.

Once angle 204 is identified, pose estimation control module 304 can then use angle 204 to determine a current implement position 308 of implement 104. For instance, when the length of connecting rod 206 is known, trigonometry can be used to calculate how much implement 104 has shifted in the vertical direction, e.g., distance 202 in FIG. 2. Once current implement position 308 is identified, pose estimation control module 304 can then cause vehicle 102 to move to a position that offsets (e.g., is opposite in direction from) the shifting of implement 104 so that current implement position 308 is positioned at correct position 108. As an example, according to the example shown in FIG. 3, pose estimation control module 304 can cause vehicle 102 to move distance 309 upward (i.e., toward the right from the perspective of vehicle 102) onto current vehicle position 310 so that current position 308 of implement 104 overlaps correct position 108 to correctly position implement 104 to plant seeds within furrows.

Although FIGS. 1-3 illustrate hinged vehicles 100 and 300 as tractors pulling seeding implements, it is to be appreciated that pose estimation control systems according to embodiments of the present disclosure are not limited to being implemented in such configurations. Rather, pose estimation control systems can be implemented in any type of hinged vehicle, such as an articulated machine, tractor trailers, and the like to accurately position the secondary part, e.g., trailer or pushed/pulled part, of the articulated machine without departing from the spirit and scope of the present disclosure.

III. Method of Pose Estimation

Figure 4:
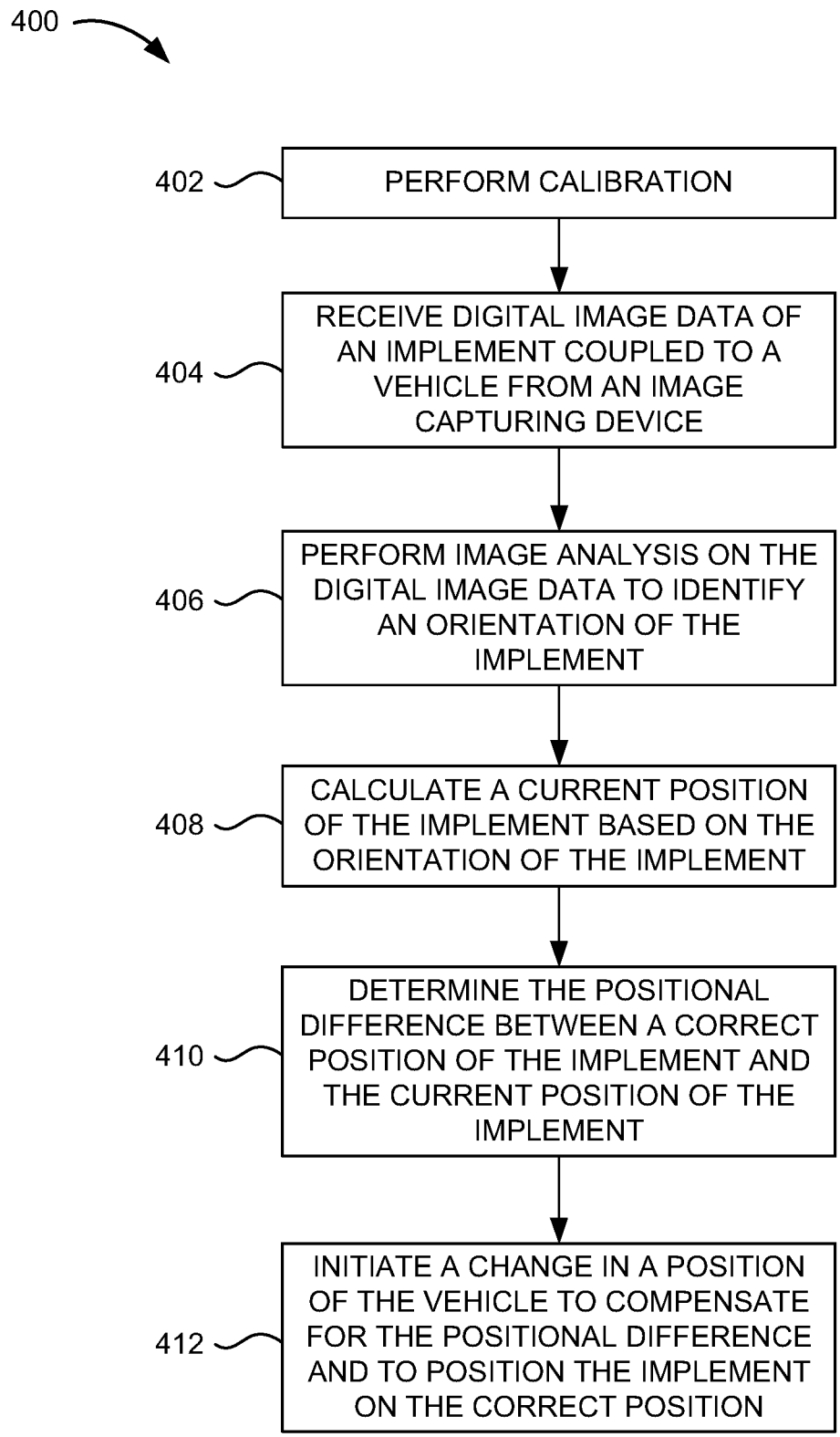
FIG. 4 is a flow chart of an example method performed by a pose estimation control system for achieving accurate positioning of an implement, according to some embodiments of the present disclosure.

FIG. 4 is a flow chart of an example method 400 performed by a pose estimation control system for achieving accurate positioning of a secondary part, e.g., an implement, according to some embodiments of the present disclosure. At block 402, calibration can be performed. In some embodiments, calibration includes driving a vehicle straight in a forward direction on flat ground so that the position of the implement is in-line with the position of the vehicle, and then capturing images of the implement with one or more image capturing devices when the implement is positioned in-line with the vehicle. The captured images can be stored in memory and linked to a state of the implement associated with being in the aligned position, that way the pose estimation control module can know what the implement looks like when the implement is positioned in-line with the vehicle. The captured images can be used as a reference by the pose estimation control system to identify an angle of the implement, as will be discussed further herein. Calibration can further include turning the vehicle as far left and right as it can and capturing images of at least a portion of the implement at those positions so that the pose estimation system can know what the implement looks like when the implement is at its farthest left and right positions by way of linking the images and states together in memory. Distance 202 shifted at those far left and right positions can be measured and stored in memory for the control module to use. For instance, the control module can use the shifted distances at the farthest left and right positions as boundaries for positional positions of the implement and then use the boundaries to form a linear scale.

At block 404, digital image data of the implement can be received by a pose estimation control module. For instance, an image of at least a portion of the implement captured by one or more image capturing devices, e.g., RGB camera or LIDAR device, can be sent to, and received by, the pose estimation control module. The digital image data can be in the form of color data for each pixel of the image in instances where the image capturing devices are RGB cameras and/or distance measurements to points on the implement in instances where the image capturing devices are LIDAR devices. In some embodiments, the digital image data represents one or more features of the implement, such as a corner of the implement, a protrusion of the implement, an edge of the implement and the like.

At block 406, image analysis can be performed on the received digital image data to identify an orientation of the implement. As an example, features represented by contrasting pixels can be identified to determine their position, and then use their determined positions to calculate an angle of the implement as discussed herein with respect to FIG. 3. In some embodiments, the angle can be calculated based on the reference/aligned position and the farthest left and right positions of the implement from images captured during the calibration process. In another example, measured distances to certain features of the implement can be analyzed to determine the angle of the implement.

With this angle, the pose estimation system can, at block 408, calculate a current position of the implement. For instance, a current position, e.g., current position 200 in FIG. 2, can be calculated using trigonometry based on the length of the connecting rod and the determined angle. Knowing the correct position at which the implement should be positioned to form evenly spaced furrows, the pose estimation control module can then, at block 410, determine the positional difference between the correct position and the current position of the implement. For instance, distance 202 in FIG. 2 can be calculated to identify how far implement 104 has shifted from correct position 108 in the vertical direction. In some embodiments, the pose estimation control module can also use the linear scale to identify how far the implement has shifted. That is, the module can track a feature position and calculate the position of the implement based on where the feature falls on the linear scale.

At block 412, the pose estimation control module can then initiate a change in a position of the vehicle to compensate for the positional difference and position of the implement on the correct position. In some embodiments, the change in distance is proportional to the positional difference so that the implement is moved to the correct position. For instance, the pose estimation control module can cause vehicle 102 to move a proportional distance 309 upward/rightward in FIG. 3 to compensate for a shift in distance 202 downward/leftward in FIG. 2 when hinged vehicle 300 is on the sloped surface. If there is no positional difference, or the positional difference is less than a threshold, e.g., a threshold of 5 cm, then the pose estimation control module can maintain a position of the vehicle so that the vehicle continues along its path. A better understanding of the values and distances calculated by the pose estimation system can be ascertained with reference to FIGS. 5 and 6.

Figure 5:
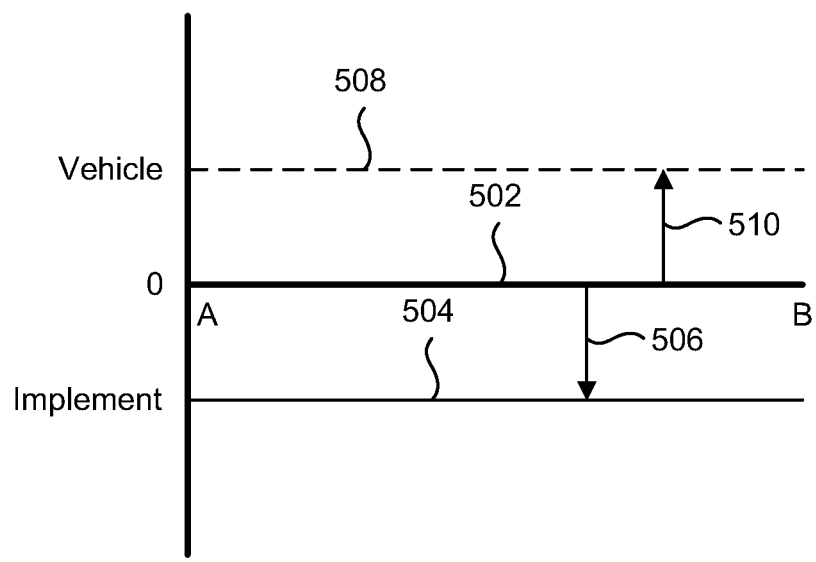
FIG. 5 is a graph representing example calculations of distances and offset values for operating a hinged vehicle with a pose estimation control system, according to some embodiments of the present disclosure.

FIG. 5 is a graph 500 representing example calculations of distances and offset values for operating a hinged vehicle with a pose estimation control system, according to some embodiments of the present disclosure. The x-axis represents a segment of path across a project site from location A to location B, and the y-axis represents distances away from a correct position 502, where correct position 502 is at 0, upward direction represents a diversion away from the correct position in a first direction, e.g., right direction, and a downward direction represents a diversion away from the correct position in a second direction opposite from the first direction, e.g., left direction.

As shown by graph 500, when the hinged vehicle moves from location A to location B across the segment of path, the pose estimation control module can continuously analyze captured images of the implement to determine its angle, and then continuously calculate the implement's current position 504 based on the determined angle. The pose estimation control module can then determine that current position 504 of the implement is a distance 506 away from correct position 502, and cause the vehicle to move a proportional correction distance 510 to position the vehicle at a corrected vehicle position 508. When the vehicle is positioned at corrected vehicle position 508, the shifting of the implement from correct position 502 may be negated, thereby accurately positioning the implement on the correct path.

Figure 6:
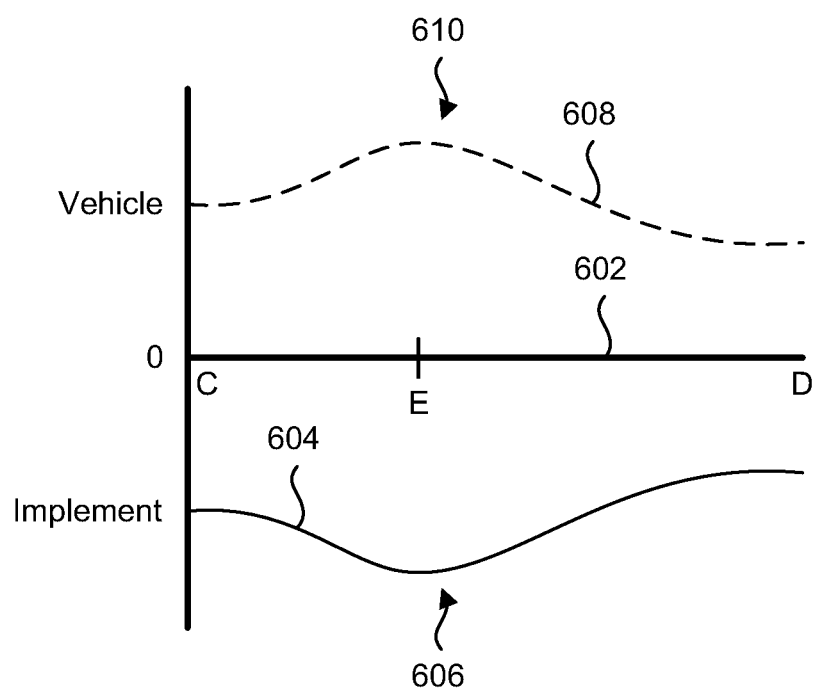
FIG. 6 is a graph representing example calculations of distances and offset values for operating a hinged vehicle with a pose estimation control system in a dynamic manner across an unevenly sloped surface, according to some embodiments of the present disclosure.

It is to be appreciated that the pose estimation control system can dynamically compensate for slope changes and undulations in real time. For example, FIG. 6 is a graph 600 representing example calculations of distances and offset values for operating a hinged vehicle with a pose estimation control system in a dynamic manner across an unevenly sloped surface, according to some embodiments of the present disclosure. The x and y axes may represent the same variables and in the same manner as graph 500 in FIG. 5.

As can be understood with reference to FIG. 6, the pose estimation control system can dynamically calculate a current position 604 of the implement as it is moving across an undulating segment of path between location C and location D and correct for any positional shifts in real time. In an example, the slope of a path from location C to location D can shift from a downward slope towards the left to a downward slope to the right at a location E. In this example, the pose estimation control module can calculate that current position 604 of the implement initially moves farther away from center in a leftward direction to a farthest point 606 at location E, and then begins to shift back toward correct position 602 as the hinged vehicle approaches location D. Thus, the pose estimation control module can cause the vehicle to change its direction according to corrected vehicle position 608 with a corresponding peak 610 at location E. That way, the implement is accurately positioned at correct location 602 even though the slop of the ground is changing across locations C and D.

In some embodiments, pose estimation control module can instruct a driver of the hinged vehicle by way of a user interface to steer the vehicle onto the corrected vehicle path. In some additional embodiments, the hinged vehicle can be an autonomous vehicle that drives with little to no participation by a human operator/driver. In such instances, the pose estimation control module can instruct a vehicle driving module to steer the vehicle to position it along corrected vehicle positions 508 and 610, accordingly.

By being configured to perform method 400, pose estimation control systems, according to some embodiments of the present disclosure, can accurately position an implement of a hinged vehicle at a correct position. Such control systems can thus result in a hinged vehicle that is improved over conventional hinged vehicles that do not have such control systems.

IV. Extensions of Pose Estimation Systems

According to some embodiments of the present disclosure, pose estimation control systems can be further configured to analyze captured images to perform functions in addition to accurately positioning an implement along a correct path. For instance, some pose estimation control systems can be further configured to identify a type of the implement that is coupled to the vehicle, and use that identification to gather more information about the implement. As an example, such pose estimation control module can analyze captured images to identify that the implement is a plow, and then use that information to identify that the connecting rod that couples to the plow is four feet long, which can then be used during operation to estimate an angle of the implement for purposes discussed herein. Some pose estimation control systems can also be configured to identify what state the implement is in, and modify an operation of the vehicle based on the state of the implement. Each of these methods of pose estimation control system operation are discussed in detail further herein.

A. Identifying a Type of an Implement by a Pose Estimation Control System

Figure 7:
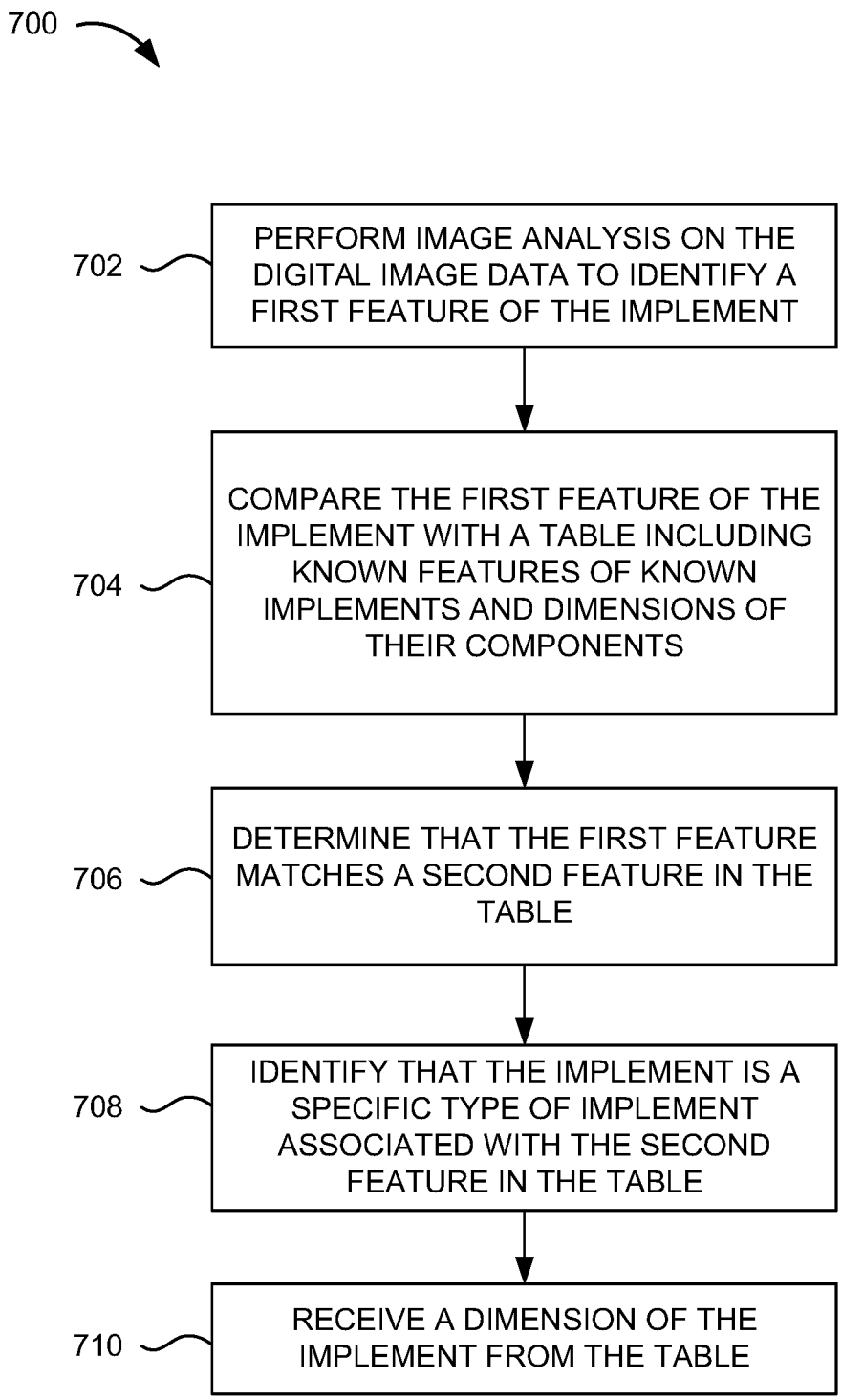
FIG. 7 is a flow chart of an example method performed by a pose estimation control system for identifying a type of an implement and then gathering more information about that implement based on the identified type, according to some embodiments of the present disclosure.

FIG. 7 is a flow chart of an example method 700 performed by a pose estimation control system for identifying a type of an implement and then gathering more information about that implement based on the identified type, according to some embodiments of the present disclosure. Method 700 can be performed during the calibration process, e.g., at block 402 in FIG. 4.

At block 702, image analysis on the digital image data can be performed to identify a first feature of the implement. In some embodiments, the first feature identified is a feature that is unique to the implement type. As an example, in instances where the implement type is a plow, the pose estimation control module can analyze the digital image data (e.g., using pixel analysis or distance measurement analysis) to identify various features identified within the digital image data. The various features can then be used to search through a database containing a plethora of digital image data for pre-identified digital images of unique features of implements (e.g., images of moldboards and plowshare features for plowing implements, images of valves and tubing for watering implements, images of seed containers for seeding implements, and the like). Once a feature from the digital image data matches a pre-identified feature, the feature can be identified as the first feature, e.g., moldboard, plowshare, valve, tubing, seed container, and the like.

The first feature can then be used by the pose estimation module, at block 704, to compare the first feature with a table containing an association between features and their associated type of implements (e.g., moldboards and plowshares are associated with plowing implements, valves and tubing are associated with watering implements, seed containers are associated with seeding implements, and the like). As an example, if the first feature is identified to be a moldboard, the moldboard feature is compared with other features of implements stored in the table. It is to be appreciated that any other suitable method for performing image classification can be used.

At block 706, the pose estimation control module can determine that the first feature matches an entry in the table containing a second feature. For example, the control module can determine that the moldboard (first feature) matches a feature entry in the table containing a moldboard (second feature). Because the table can associate features with types of implements, the pose estimation module can then use that association at step 708 to identify that the implement is a specific type of implement associated with the second feature. As an example, continuing with the example above, the control module can identify that the implement is a plow because the moldboard identified from the digital image data matches the entry in the table for a moldboard that is associated with a plowing implement.

In some alternative embodiments, the first feature can be a barcode that identifies the type of implement. The barcode can be located on the implement and whose image can be captured by one or more image capturing devices. The captured barcode can be used to reference a table containing associations between barcode entries and types of implements. Thus, the pose estimation system can compare the captured barcode the barcode entries, and identify the type of implement associated with a matching barcode entry.

In addition to identifying the type of implement, the pose estimation control module can further use the identification to receive more data about the implement. For instance, at block 710, the pose estimation control module can receive more information about the dimension of the implement as a whole or the dimension of certain parts of the implement. As an example, the pose estimation control module can receive a length of a control rod. This length can be used later on to identify a distance between a current position of the implement and the correct position to move the vehicle into the corrected vehicle position, as discussed herein with respect to FIGS. 3, 5, and 6, according to some embodiments of the present disclosure. This information can be stored in the table or in any other database.

B. Identifying a State of an Implement by a Pose Estimation Control System

Figure 8:
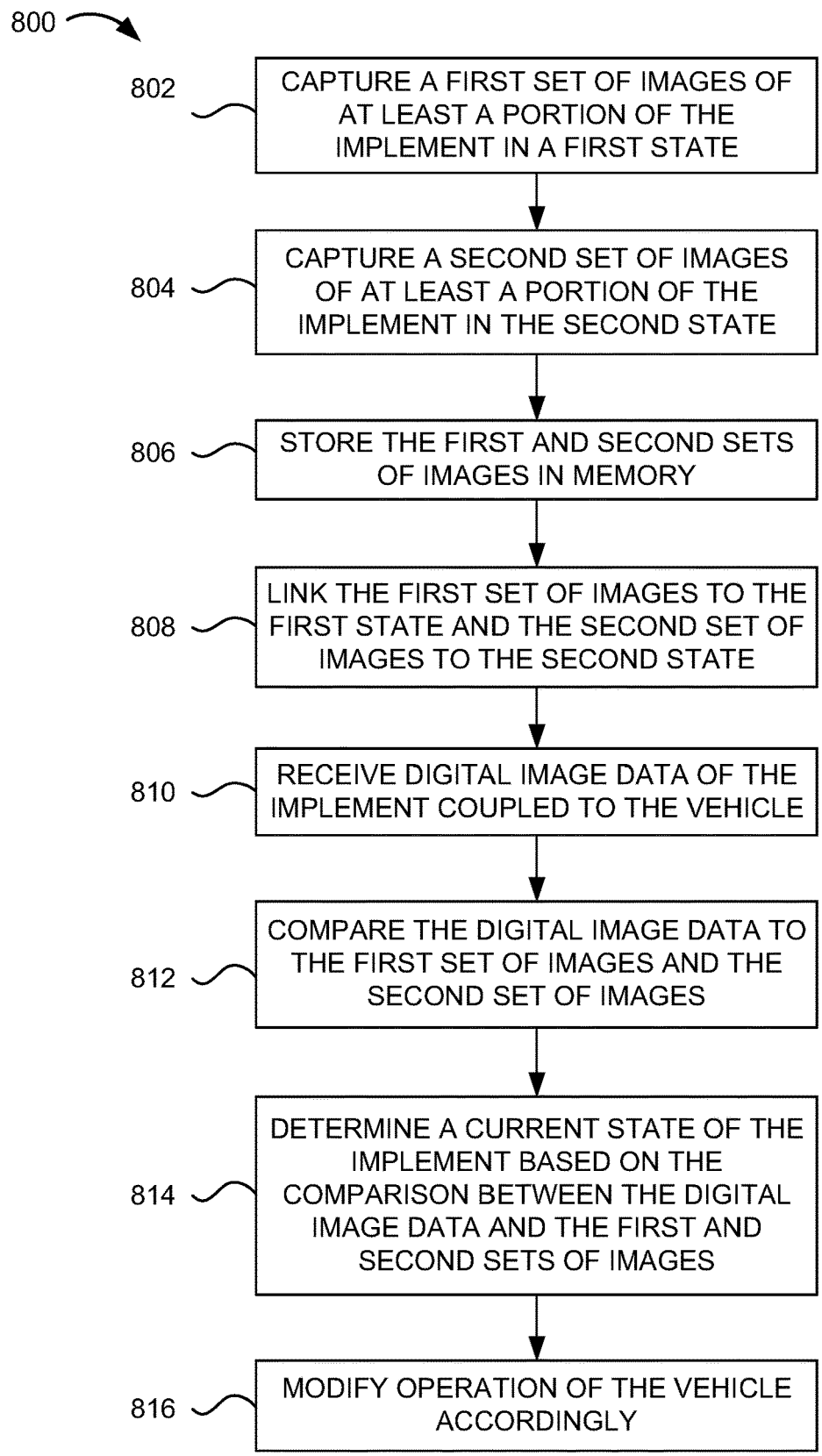
FIG. 8 is a flow chart of an example method performed by a pose estimation control system for identifying a state of an implement and then modifying an operation of the vehicle based on the state of the implement, according to some embodiments of the present disclosure.

FIG. 8 is a flow chart 800 of an example method performed by a pose estimation control system for identifying a state of an implement and then modifying an operation of the vehicle based on the state of the implement, according to some embodiments of the present disclosure. At block 802, a first set of images of at least a portion of the implement is captured when the implement is in a first state. As an example, images of a plowing implement in an engaged state where the moldboards and plowshares are lowered into the ground for forming furrows can be captured. In some embodiments, images are captured from each image capturing device so that as much area of the implement can be captured. Capturing a greater amount of area of the implement when the implement is in each position allows the pose estimation control system to be more accurate. This is because some cameras may capture certain features that other cameras may not, and those certain features may be helpful to identify which state the implement is in later in the process.

At block 804, a second set of images of at least a portion of the implement is captured when the implement is in a second state different from the first state. As an example, images of a plowing implement in a disengaged state where the moldboards and plowshares are lifted out of the ground for transportation purposes can be captured. Although FIG. 8 only discusses capturing images of the implement in first and second states, it is to be appreciated that embodiments are not so limited. Additional embodiments may capture images of the implement in every possible state so that the pose estimation system can identify whether the implement is in each possible state during operation, as will be discussed further herein.

The first and second sets of images can, at block 806, be stored in memory so that it can be accessed and referenced by the pose estimation control module when it is trying to identify the state of the implement based on images captured by the cameras during operation of the implement. Then, at block 808, the first set of images can be linked to the first state of the implement, and the second set of images can be linked to the second state of the implement in memory. For instance, the first set of images of the implement can be linked to an engaged state of the implement in memory, and the second set of images of the implement can be linked to a disengaged state of the implement in memory.

In some embodiments, blocks 802, 804, 806, and 808 can be performed during calibration of the implement when it is coupled to the vehicle. As an example, blocks 802, 804, 806, and 808 can be performed sometime during block 402 in FIG. 4. The pose estimation control system can guide the technician through the image capturing process, e.g., by prompting the technician to move the implement into the different states and initiate image capture from all the image capturing devices when the implement is in each state.

At block 810, digital image data of the implement can be captured by one or more image capturing devices. In some embodiments, block may be performed at block 404 in FIG. 4, instead of being performed separately. In other embodiments, block 810 is performed in addition to block 404. The operation and purpose of the pose estimation control module at block 810 can be substantially similar to the operation and purpose of the pose estimation control module at block 404. Thus, the operation and purpose is not discussed here for brevity.

At block 812, the digital image data is compared to the first and second sets of images. For instance, the digital image data in memory is compared to the digital representation of the first and second sets of images in memory to determine the position of one or more identified features in the digital image data with respect to one or more corresponding features in the first or second set of images. As an example, a position of a top part of the implement's moldboard identified in the digital image data can be compared to the position of a corresponding top part of the implement's corresponding moldboard in the first and/or second set of images. The features that are compared between the digital image data and the first and second sets of images can be features that move between the different states and are thus indicative of the state of the implement as opposed to features that do not move and are not indicative of the state of the implement. For instance, a suitable feature can be a moldboard or a plowshare that moves down to plow land and up for transport of the implement.

Then, at block 814, a current state of the implement can be determined based on the comparison between the digital image data and the first and second sets of images. For instance, if the position of the top part of the implement's moldboard identified in the digital image data matches the position of the corresponding top part of the implement's corresponding moldboard in the first set of images, then the pose estimation control module can determine that the current state of the implement is the first state. If the position of the top part of the implement's moldboard identified in the digital image data matches the position of the corresponding top part of the implement's corresponding moldboard in the second set of images, then the pose estimation control module can determine that the current state of the implement is the second state.

In some embodiments, the pose estimation control module can identify its current state as being in an intermediate state between the first state and the second state. The intermediate state can be a state of the implement where a position of one or more features of the implement, e.g., moldboard or plowshare, is between its respective positions in the first and second states, where the first and second states form the boundaries of a linear percentage scale. For instance, the pose estimation control module can associate the engaged position (e.g., fully down position) of the moldboard and/or plowshare of the implement in the first set of images as an initial state of 0%, and associate the disengaged position (e.g., fully up position) of the moldboard and/or plowshare of the implement in the second set of images as a final state of 100%. With those boundaries, the pose estimation control module can compare the identified features in the digital image data with the corresponding features in the first and second sets of images to identify the current position of the moldboard and/or plowshare from the digital image data, and then identify its intermediate state as being a position between the first and second states represented as a percentage between 0% and 100%. For instance, the pose estimation module can identify that the implement has its moldboard and/or plowshare opened at 40%, 50%, 60%, or any other percentage.

Once the state of the implement is determined, then the pose estimation control module can, at block 816, modify an operation of the vehicle based on the identified state of the implement. As an example, if the pose estimation control module determines that the implement is in the first state, e.g., the engaged state, or an intermediate state where the moldboard and/or plowshare is at a target depth to form shallow furrows, then the vehicle can be allowed to drive across the farmland in regions where furrows are intended to be formed. If the implement is not on the farmland and is in a region where furrows are not intended to be formed, then the pose estimation control module may prevent movement of the vehicle and send a warning message to the driver when the pose estimation control module determines that the implement is in the second state, e.g., the disengaged state, or an intermediate state where the moldboard and/or plowshare is not high enough to be raised out of the ground.

In embodiments where the hinged vehicle is an autonomous vehicle, the pose estimation control module can directly cause the vehicle to start driving when it determines that the implement is in the first state and positioned in an area where furrows are intended to be formed. For example, pose estimation control module can begin driving the vehicle while capturing images of the implement to identify its current position and correspondingly steer the vehicle to the corrected vehicle position when it determines that the implement is not positioned on the correct path, as discussed herein with respect to FIGS. 3-6. Otherwise, pose estimation control can stop the vehicle if it determines that the implement is in the first state and positioned in an area where furrows are not intended to be formed. That way, the implement is prevented from inadvertently damaging the ground where furrows are not intended to be formed.

V. Pose Estimation Control System

Figure 9:
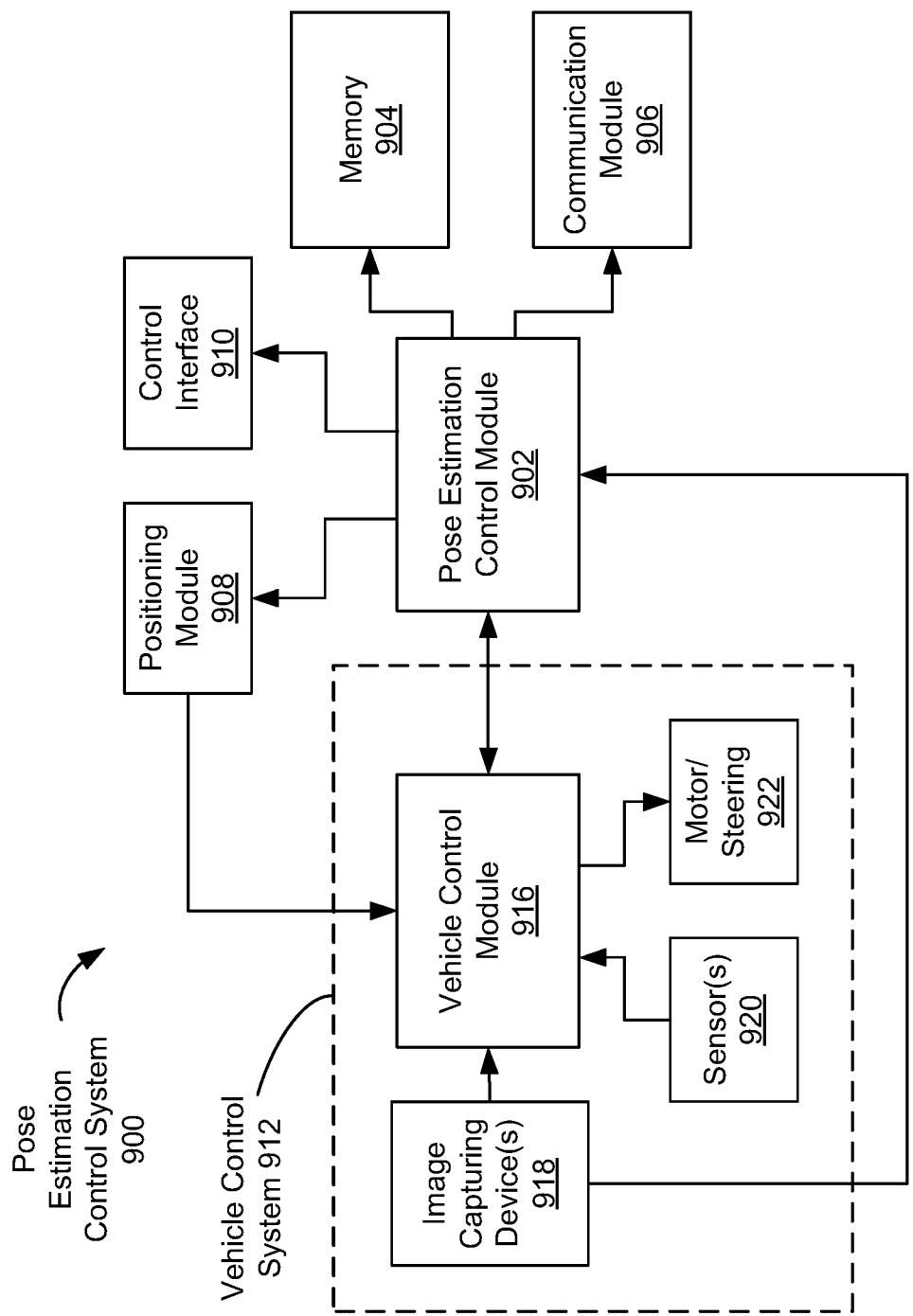
FIG. 9 is a block diagram of an example pose estimation control system, according to some embodiments of the present disclosure.

FIG. 9 is a block diagram of an example pose estimation moisture control system 900, according to some embodiments of the present disclosure. System 900 can be implemented in a hinged vehicle to improve its operation by performing any of the methods discussed herein to achieve an accurate position of an implement. Pose estimation control system 900 can include a pose estimation control module 902 that can be formed of one or more processors. Pose estimation control module 902 can receive a series of inputs, perform computations based on those inputs, and send outputs to various other components to instruct them on their operation, as aforementioned herein. Pose estimation control module 902 can be coupled to memory 904 in which lines of code for instructing the operation of pose estimation control module 902 can be stored. Additionally, memory 904 can store data that is used by pose estimation control module 902 to perform its computations. For instance, digital image data, sets of images of an implement, distances between positions, angles of coupling rods, tables drawing associations between types of implements and features and the like, can be stored in memory 904 by pose estimation control module 902.

Pose estimation control system 900 can also include a communication module 906 coupled to pose estimation control module 902 to facilitate communication with other devices over wireless circuitry through a wireless network (e.g., the Internet, wireless LAN, LTE, GSM, etc.) and includes various software components for handling data received from the wireless circuitry. By being coupled to communication module 906, pose estimation control module 902 can send notifications to external devices and/or receive commands from external devices to control the movement of the hinged vehicle on the project site.

In some embodiments, pose estimation control system 900 can further include a positioning module 908 coupled to pose estimation control module 902. Positioning module 908 can be any suitable positioning system, such as a global positioning system (GPS) or any other global or local triangulation system for determining the position of autonomous pose estimation control system 900. By being coupled to positioning module 908, pose estimation control module 902 can determine its location within the project site so that it can traverse along a predetermined path, e.g., a path along a correct position or a corrected vehicle position discussed herein with respect to FIGS. 3-6.

Autonomous pose estimation control system 900 can also include a control interface 910 coupled to pose estimation control module 902. Control interface 910 can be any suitable user interface, such as a display screen, touch screen, keyboard, and the like for outputting information to a user, e.g., a driver of the hinged vehicle, and/or receiving input information. In some embodiments, control interface 910 can include an input device. By being coupled to control interface 910, pose estimation control module 902 can send instructions to control interface 910 to guide system 900 along the corrected vehicle position to accurately position the implement on a correct path, as discussed herein with respect to FIGS. 3-6. Guidance of system 900 can be performed by instructing a driver of the hinged vehicle via the control interface 910.

As discussed herein, pose estimation control system 900 can, in some embodiments, guide the hinged vehicle autonomously, i.e., without user involvement. Thus, pose estimation control system 900 can be configured to interact with a vehicle control system 912 to directly control the operation of the vehicle. In some embodiments, vehicle control system 912 can be implemented in the hinged vehicle and can include a vehicle control module 916 that is coupled to one or more cameras 918, one or more sensors 920, and motor/steering module 922. Cameras 918 can be any image capturing device discussed herein for observing the vehicle's surroundings for autonomous driving purposes as well as for capturing images of the implement for accurate positioning of the implement as discussed herein. Vehicle control module can be configured to receive information from camera(s) 918 and sensor(s) 920 to safely and appropriately drive the hinged vehicle along the corrected vehicle path by controlling motor/steering 922 without user involvement. In such embodiments, vehicle control module 916 can be coupled to positioning module 908 so that vehicle control module 916 can know the positioning of system 900 in relation to the project site. Furthermore, communication module 906, in such embodiments, can be configured to send data through the wireless network to inform a user located in a location separate from system 900 about the positional status of pose estimation control system 900. Communication module 906 can also receive instructions from a user that is at a location separate from system 900 to remotely control the operation of system 900. By guiding the hinged vehicle along the corrected vehicle path, pose estimation control system 900 can very accurately position the implement along the correct path despite any surface slopes and undulations.

Although the invention has been described with respect to specific embodiments, it will be appreciated that the invention is intended to cover all modifications and equivalents within the scope of the following claims.

What is claimed is:

1. A method for positioning a hinged vehicle including a primary part and a secondary part coupled to the primary part at a project site, comprising:
   receiving, by a pose estimation control system from an image capturing device, digital image data representing one or more features of the secondary part;
   performing, by the pose estimation control system, image analysis on the digital image data to identify positions of the one or more features of the secondary part;
   identifying, by the pose estimation control system, an angle of at least a portion of the secondary part based on the positions of the one or more features of the secondary part from the analysis of the digital image data;
   calculating, by the pose estimation control system, a current position of the secondary part based on the angle of the at least a portion of the secondary part;
   calculating, by the pose estimation control system, a positional difference between a correct position at the project site for the secondary part and the current position of the secondary part at the project site, wherein the secondary part forms substantially evenly spaced furrows at the correct position and the positional difference is a vector;
   determining, by the pose estimation control system, that the positional difference is greater than a threshold; and thereafter
   initiating, by the pose estimation control system, a change in a position of the primary part to compensate for the positional difference, so that the secondary part is positioned on the correct position and the primary part is offset from the correct position.

2. The method of claim 1, wherein the image capturing device is implemented on the primary part and captures images within a field of view that includes at least a portion of the secondary part.

3. The method of claim 1, wherein the primary part moves the secondary part by pushing or pulling the secondary part across the project site.

4. The method of claim 1, further comprising:
   capturing a calibration image of the at least a portion of the secondary part when the secondary part is positioned in-line with the primary part;
   storing the image in memory; and
   linking the calibration image to a reference position for the secondary part so that the pose estimation control system can use the reference position of the secondary part to calculate the angle.

5. The method of claim 1, wherein the image analysis comprises:
   analyzing contrasting pixels to identify positions of features of the secondary part; and
   using the positions of the features to identify the angle of the secondary part.

6. The method of claim 1, wherein the image analysis comprises analyzing distance measurements of points of the secondary parts to identify features of the secondary part; and
   using the positions of the features to identify the angle of the secondary part.

7. The method of claim 1, wherein the primary part is a vehicle and the secondary part is an implement.

8. The method of claim 1, wherein changing the position of the primary part includes outputting an instruction to a user interface that causes a driver of the hinged vehicle to steer the primary part.

9. The method of claim 1, wherein changing the position of the primary part includes instructing a vehicle control system to move and steer the hinged vehicle along a corrected primary part position so that the secondary part is positioned on the correct position without user involvement.

10. A computer product comprising a non-transitory computer readable medium storing a plurality of instructions that when executed control an electronic device including one or more processors, the electronic device is configured to position a hinged vehicle including a primary part and a secondary part coupled to the primary part at a project site, the instructions comprising:
    receiving, by a pose estimation control system from an image capturing device, digital image data representing one or more features of the secondary part;
    performing, by the pose estimation control system, image analysis on the digital image data to identify positions of the one or more features of the secondary part;
    identifying, by the pose estimation control system, an angle of at least a portion of the secondary part based on the positions of the one or more features of the secondary part from the analysis of the digital image data;
    calculating, by the pose estimation control system, a current position of the secondary part based on the angle of the at least a portion of the secondary part;
    calculating, by the pose estimation control system, a positional difference between a correct position at the project site for the secondary part and the current position of the secondary part at the project site, wherein the secondary part forms substantially evenly spaced furrows at the correct position and the positional difference is a vector;
    determining, by the pose estimation control system, that the positional difference is greater than a threshold; and thereafter
    initiating, by the pose estimation control system, a change in a position of the primary part to compensate for the positional difference, so that the secondary part is positioned on the correct position and the primary part is offset from the correct position.

11. The computer product of claim 10, wherein the image capturing device is implemented on the primary part and captures images within a field of view that includes at least a portion of the secondary part.

12. The computer product of claim 10, wherein the primary part moves the secondary part by pushing or pulling the secondary part across the project site.

13. The computer product of claim 10, further comprising:
capturing a calibration image of the at least a portion of the secondary part when the secondary part is positioned in-line with the primary part;
storing the image in memory; and
linking the calibration image to a reference position for the secondary part so that the pose estimation control system can use the reference position of the secondary part to calculate the angle.

14. The computer product of claim 10, wherein the image analysis comprises:
analyzing contrasting pixels to identify positions of features of the secondary part; and
using the positions of the features to identify the angle of the secondary part.

15. A system for positioning a hinged vehicle including a primary part and a secondary part coupled to the primary part at a project site, the system comprising:
an image capturing device mounted on the primary component;
memory configured to store data;
a control interface for displaying information to a user; and
a pose estimation control module formed of one or more processors coupled to the image capturing device, the memory, and the control interface, the pose estimation control module being configured to:
receive, by the pose estimation control module from an image capturing device, digital image data representing one or more features of the secondary part;
perform, by the pose estimation control module, image analysis on the digital image data to identify positions of the one or more features of the secondary part;
identify, by the pose estimation control module, an angle of at least a portion of the secondary part based on the positions of the one or more features of the secondary part from the analysis of the digital image data;
calculate, by the pose estimation control module, a current position of the secondary part based on the angle of the at least a portion of the secondary part;
calculate, by the pose estimation control module, a positional difference between a correct position at the project site for the secondary part and the current position of the secondary part at the project site, wherein the secondary part forms substantially evenly spaced furrows at the correct position and the positional difference is a vector;
determine, by the pose estimation control module, that the positional difference is greater than a threshold; and thereafter
initiate, by the pose estimation control module, a change in a position of the primary part to compensate for the positional difference, so that the secondary part is positioned on the correct position and the primary part is offset from the correct position.

16. The system of claim 15, wherein the image capturing device is implemented on the primary part and captures images within a field of view that includes at least a portion of the secondary part.

17. The system of claim 15, wherein the pose estimation control module is coupled to a vehicle control system that includes a vehicle control module for controlling an operation of the hinged vehicle without user involvement.

18. The system of claim 17, wherein the vehicle control system further includes a camera, a sensor, and a motor with steering to control an operation of the hinged vehicle.

19. The system of claim 15, wherein the primary part moves the secondary part by pushing or pulling the secondary part across the project site.

20. The system of claim 15, wherein the pose estimation control module is further configured to:
capture a calibration image of the at least a portion of the secondary part when the secondary part is positioned in-line with the primary part;
store the image in memory; and
link the calibration image to a reference position for the secondary part so that the pose estimation control module can use the reference position of the secondary part to calculate the angle.

* * * * *